United States Patent
Broomhall et al.

[11] Patent Number: 5,944,947
[45] Date of Patent: Aug. 31, 1999

[54] APPARATUS AND METHOD FOR FABRICATING LAMINATED STRUCTURES

[75] Inventors: Simon John Broomhall, Sechelt; Gary Edwin Cook, Vancouver, both of Canada

[73] Assignee: Jesam Industries Incorporated, Sechelt, Canada

[21] Appl. No.: 09/009,957

[22] Filed: Jan. 21, 1998

[51] Int. Cl.$^6$ ................................... B32B 31/00
[52] U.S. Cl. .................... 156/556; 156/580; 156/228
[58] Field of Search .................. 156/556, 580, 156/581, 583.3, 230, 241, 228; 269/21

[56] References Cited

U.S. PATENT DOCUMENTS

| | | | |
|---|---|---|---|
| 4,301,999 | 11/1981 | Higgins et al. | 269/21 |
| 4,648,934 | 3/1987 | Kiss | 156/228 X |
| 4,705,438 | 11/1987 | Zimmerman et al. | 269/21 X |
| 4,927,479 | 5/1990 | Böck | 156/580 X |
| 5,092,954 | 3/1992 | Braun et al. | 156/581 X |
| 5,318,659 | 6/1994 | Manico et al. | 156/580 X |

OTHER PUBLICATIONS

Brochure of CTS–Press 8.5e (1989) –Switzerland*
Brochure of CTS–Press 4.3 (1989) –Switzerland*

*Primary Examiner*—James Engel
*Attorney, Agent, or Firm*—Oyen Wiggs Green & Mutala

[57] ABSTRACT

A laminating machine has an upper platen which is laterally rigid but transversely flexible. The upper platen is adjacent to a lower platen. Two sheets of material to be laminated together to form a laminated structure, such as a membrane switch, are held respectively on the upper and lower platens. A press roller is mounted behind the upper platen. The press roller is connected to an actuator that can sweep the press roller across the back face of the upper platen. The laminating cycle includes moving the upper platen so that it makes a shallow angle with the lower platen and advancing the press roller to flex the lower platen. The press roller is then advanced to compress the upper platen against the lower platen along a narrow nip which sweeps across the face of the lower platen. The machine avoids entrapment of air between the sheets which is a problem in prior laminating machines. The machine may be made in a manner which facilitates the quick and accurate alignment of the sheets on the upper and lower platens.

16 Claims, 12 Drawing Sheets

APPARATUS AND METHOD FOR FABRICATING LAMINATED STRUCTURES

FIELD OF THE INVENTION

This invention relates to apparatus and methods for laminating together the layers of a laminated structure. More particularly, the invention relates to laminating apparatus wherein layers in a laminated structure are pressed together between a pair of platens. The invention has particular application in the fabrication of laminated membrane type electrical switches.

BACKGROUND OF THE INVENTION

Electrical membrane switches are fabricated by laminating together several layers. A typical membrane switch has at least a base layer, a top layer and an adhesive layer sandwiched between the base layer and the top layer. The adhesive layer has apertures in it which correspond to the locations of electrical switches and other devices. Some more complicated membrane switch structures are made from 5 or more laminated layers.

In fabricating membrane switches it is important to maintain accurate relative alignment between the different layers. Maintaining such registration is complicated by the fact that the layers are adhesively bonded together. The layers stick to each other as soon as they are brought into contact with their adhesive surfaces exposed. Therefore the layers must be accurately aligned as they are brought together.

It is also very important to prevent air from being entrapped between the layers as they are laminated together. The presence of air bubbles can lead to the eventual malfunction of a membrane switch and can also adversely effect the appearance of a membrane switch.

Various techniques and apparatus have been used in the fabrication of membrane switches and similar laminated structures. A significant problem is that such techniques are undesirably slow, insufficiently accurate, or require skilled craftsmanship to practice. There have been some previous attempts to fabricate automated apparatus for building laminated structures. Such apparatus has generally been unsatisfactory.

One prior device known to the inventors had a curved rigid vacuum platen located above a flat vacuum platen. One sheet of a laminated structure could be placed against a guide on the flat platen. Another sheet of the laminated structure could be placed against a guide on the curved platen. The sheets could be held in place by a vacuum. The apparatus could then be operated to cause the curved platen to press against and to roll across the flat platen, thereby pressing the two sheets together. This device had significant problems. The curved platen interfered with easily and accurately aligning the lower sheet on the flat platen. It was difficult to accurately align the top sheet on the curved platen. Furthermore, the trailing edge of the curved platen would lift free of the top sheet as the curved platen travelled across the flat platen. This caused a loss of vacuum in the curved platen which could result in the top sheet falling onto the bottom sheet and trapping air bubbles between the sheets.

There is need for apparatus and methods for quickly and accurately laminating together the sheets which form a laminated structure, such as a membrane switch.

SUMMARY OF THE INVENTION

A first aspect of this invention provides a laminating apparatus for laminating first and second sheets together into a laminated structure. The laminating apparatus comprises: a first platen for holding a first sheet to be laminated into a laminated structure, a press roller oriented transversely to and parallel with a surface of the first platen, and a transversely flexible second platen for holding a second sheet to be laminated into the laminated structure. The press roller is slidably coupled to the first platen for motion across the surface of the first platen. The second platen is positionable between the press roller and the first platen. The second platen has first and second faces, the first face facing the surface of the first platen and the second face facing the press roller when the second platen is between the press roller and the first platen. the apparatus also comprises a drive system for driving the press roller across the second face of the second platen toward an edge of the second platen and forcing the press roller toward the surface of the first platen and, an actuator coupled to the second platen to pull the edge of the second platen away from the surface of the first platen, thereby flexing the second platen about the press roller. The flexing of the second platen prevents those portions of the sheets being laminated together which are ahead of the press roller from contacting one another. This, in turn, virtually eliminates the possibility that air will become entrapped between the sheets during lamination.

Another aspect of the invention provides a method for laminating first and second sheets together to form a laminated structure. The method begins with holding the first sheet on a surface of a first platen and holding the second sheet on a face of a second platen. The method continues by aligning the second platen over the first platen with the first sheet aligned with the first sheet; flexing the second platen by pressing a press roller against a back face of the second platen while holding an edge portion of the second platen away from the surface of the first platen; and, moving the press roller across the back face of the second platen, thereby compressing the first and second sheets together along a nip between the press roller and the surface of the first platen.

BRIEF DESCRIPTION OF THE DRAWINGS

In drawings which illustrate specific embodiments of the invention, but which should not be construed as restricting the spirit or scope of the invention in any way.

DETAILED DESCRIPTION

As shown in FIGS. 1A through 1D, this invention provides an apparatus 20 which comprises an upper platen 22 and a lower platen 24. Upper platen 22 is flexible and movable and is driven by a drive system 26. The operation of drive system 26 is discussed in more detail below. Apparatus 20 also comprises a movable press roller 28 which is controlled by a drive system 30. The overall operation of apparatus 20 is controlled by a controller 32.

Figure 1A:
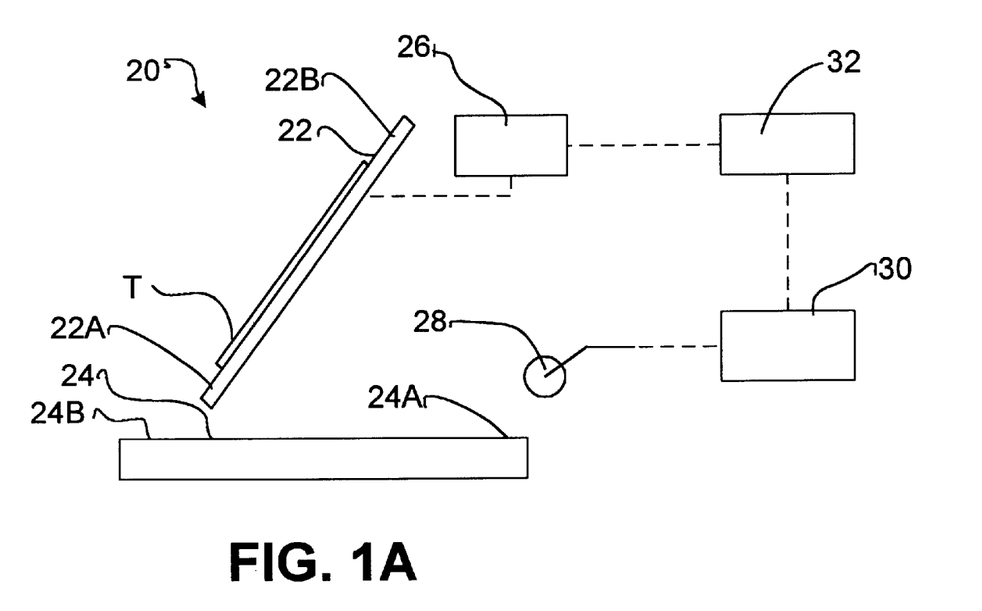
FIGS. 1A, 1B, 1C, and 1D are simplified schematic views showing apparatus for practising the invention at several steps during its operation according to a method according to a preferred embodiment of the invention.

FIG. 1A shows apparatus 20 in its initial configuration (step 200). Upper platen 22 is generally erect. A first, lower, edge 22A of upper platen 22 is positioned forwardly from the corresponding first edge 24A of lower platen 24. An operator has positioned a top sheet T for a laminated structure on upper platen 22 and has aligned top sheet T with a guide (not shown in FIG. 1A) on upper platen 22. It can be appreciated that the operator has close unobstructed access to upper platen 22 from the side of apparatus 20 adjacent second edge 24B of lower platen 24.

Top sheet T is held to upper platen 22 by a vacuum, as described below. If top sheet T is covered by a release sheet then the operator may conveniently remove the release sheet when top sheet T is held on upper platen 22 in its proper position. This provides a significant advantage over those prior devices and methods which require removal of the release sheet prior to positioning the top sheet. Top sheet T may have a number of loosely connected parts which, after the release sheet is removed, may be difficult to keep properly positioned. The design of upper platen 22 allows a release sheet to be removed after top sheet T has been aligned with and held on upper platen 22. Therefore, any loosely connected parts are held in place by upper platen 22.

After the operator has positioned top sheet T on upper platen 22 then the operator signals controller 32 by, for example, pushing a button. Controller 32 then causes drive system 26 to move upper platen into the position shown in FIG. 2 (step 202). When apparatus 20 is in the configuration of FIG. 1B the operator has unobstructed access to the top surface of lower platen 24. The operator can then place a bottom sheet B on lower platen 24. A guide (not shown in FIG. 1B) is provided to assist in properly positioning bottom sheet B on lower platen 24. Bottom sheet B is held on lower platen 24 by vacuum.

When bottom sheet B has been properly positioned on lower platen 24 the operator may remove the release sheet, if any, from lower sheet B and then signal controller 32 that top sheet T and bottom sheet B are in apparatus 20 and are ready to be laminated together. Controller 32 then causes drive systems 26 and 30 to move (step 210) upper platen 22 and press roller 28 into the configuration shown in FIG. 1C in preparation for lamination.

Figure 1B:
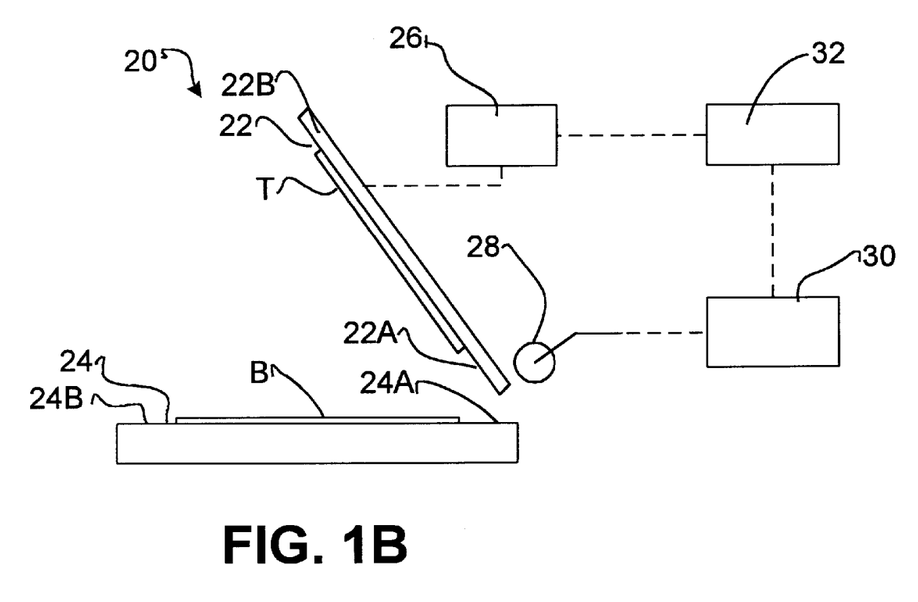
Figure 1C:
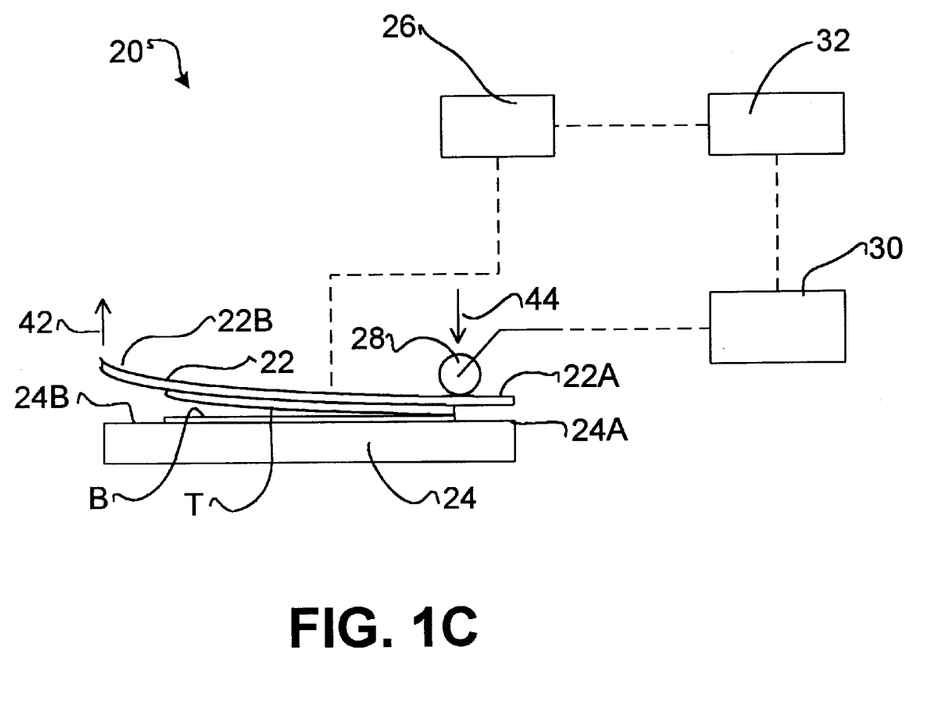
Figure 2:
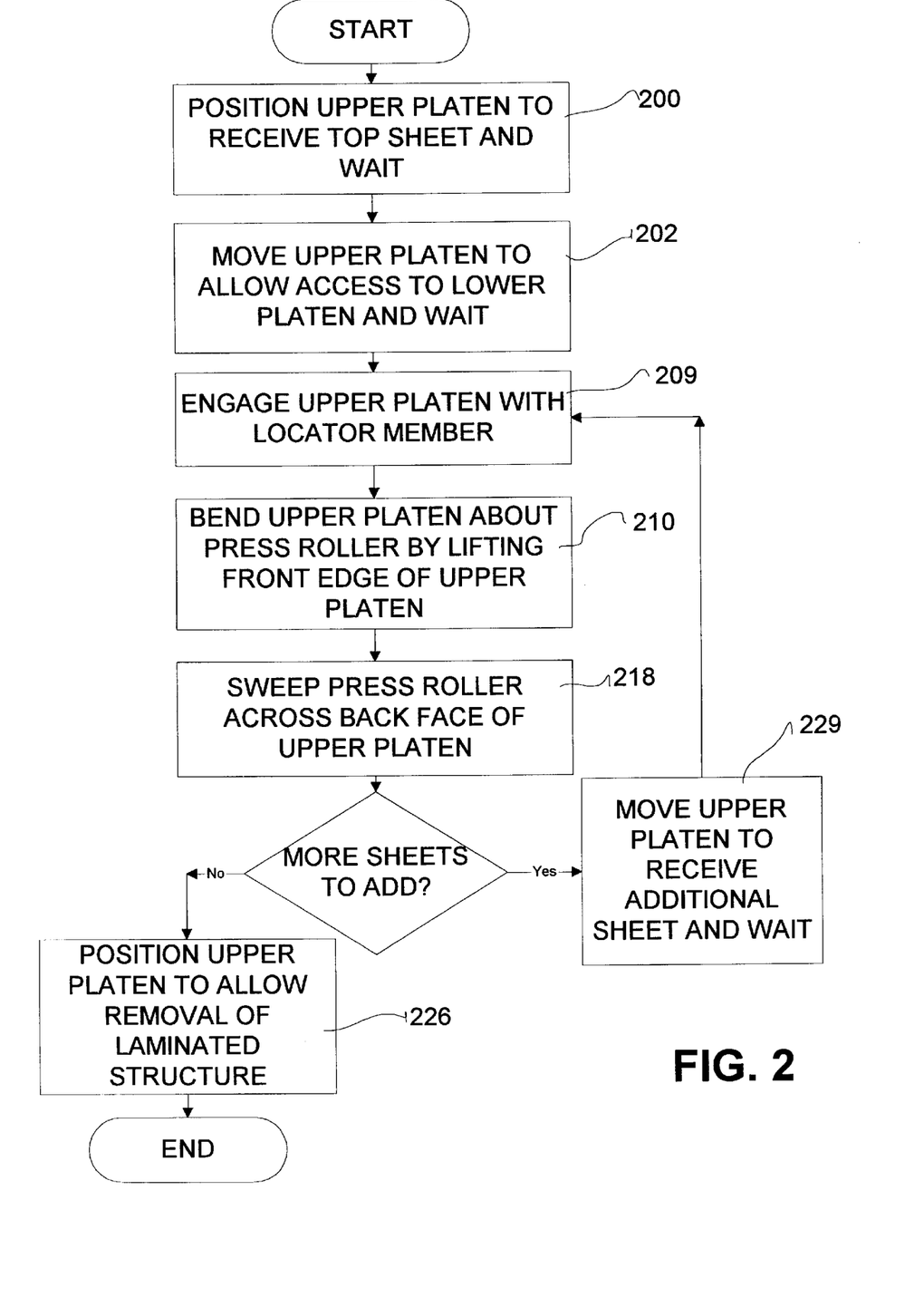
FIG. 2 is a block diagram of a method according to the invention.

In moving from the configuration of FIG. 1B to the configuration of FIG. 1C, drive system 26 pivots upper platen 22 forwardly. At the same time, drive system 30 advances press roller 28 until press roller 28 is pressing on the rear face 22C of upper platen 22. Drive system 26 pulls upwardly on the second edge 22B of upper platen 22, with a force 42, while press roller 28 presses downwardly on upper platen 22 with a force 44. Force 44 is greater than force 42 so that upper platen 22 is flexed about press roller 28. Press roller 28 acts as a fulcrum for bending upper platen 22.

Press roller 28 initially presses down on upper platen 22 along a line or "nip" which extends transversely across upper platen 22 and lower platen 24 at a position located between first edge 22A and the edge of top sheet T closest to first edge 22A. Upper platen 22 bears on lower platen 24 with significant pressure along the nip.

In general, force 44 is selected to provide sufficient pressure along the nip to properly laminate top sheet T and bottom sheet B together. Force 42 is selected so as to flex the forward portion of upper platen 22 upwardly just enough to prevent top sheet T from touching bottom sheet B in its portion in front of the nip (i.e. in its portion toward edge 22B of upper platen 22).

If there is sufficient slack in drive system 26 to possibly prevent upper platen 22 from being precisely and repeatably aligned with lower platen 24 then upper platen 22 preferably engages one or more locating members (step 209) which may be constructed, for example, as described below, as it is moved into the position shown in FIG. 1C. The locating members prevent upper platen 22 from being translated or skewed relative to lower platen 24.

Figure 1D:
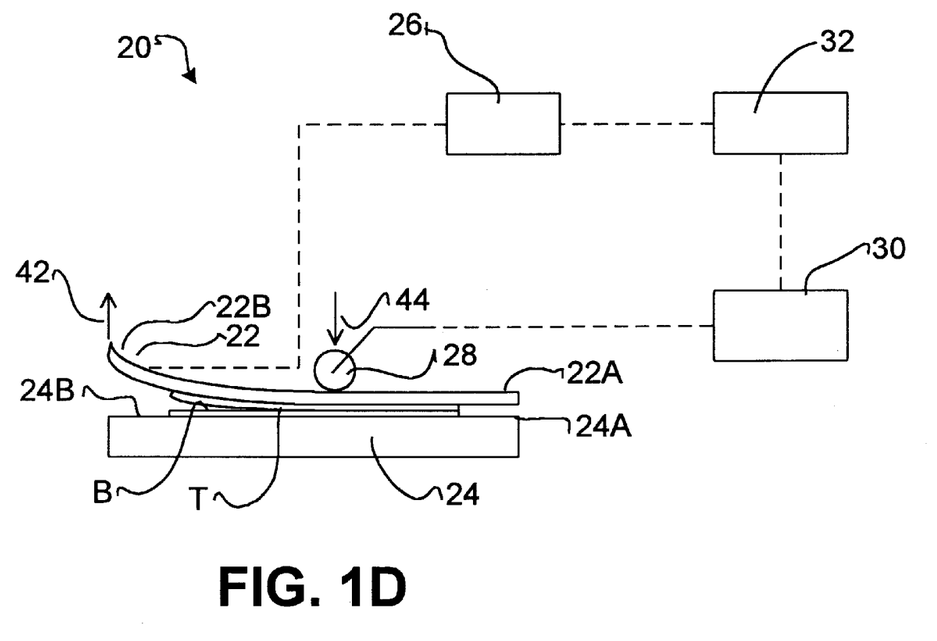

Controller 32 then causes drive system 30 to move press roller 28 forwardly to a location above lower platen 24 near its rear edge 24A and to press downwardly on the back face of upper platen 22 to bring upper platen 22 into contact with upper surface 325 of lower platen 24. Drive system 30 then moves press roller 28 across the rear face of upper platen 22 toward second edge 22B while maintaining downward force 44 (step 218). This compresses upper platen 22 toward lower platen 24 along a line of contact or "nip" which sweeps along lower platen 24 from first edge 24A toward second edge 24B. As this happens, top sheet T is laminated to bottom sheet B as shown in FIG. 1D.

The rear (first) edge 22A of upper platen 22 is held during step 218 so that upper platen 22 extends generally parallel to lower platen 24 in its portions between press roller 28 and first edge 24A. Drive system 26 continues to apply force 42 lifting forward (second) edge 22B of upper platen 22 so that the portions of upper platen 22 between press roller 28 and second edge 22B arc upwardly. The flexion of the forward portion of upper platen 22 away from lower platen 24 prevents top sheet T and bottom sheet B from coming into contact with each other in their portions forward from press roller 28. This, prevents air from becoming trapped between top sheet T and bottom sheet B.

After press roller 28 has passed completely across top sheet T and bottom sheet B, which have now been laminated together, controller 32 causes drive system 30 to retract press roller 28 and lift upper platen 22 to provide access to the resulting laminated structure (step 226). If it is desired to add additional layers to the laminated structure then the vacuum may be released on upper platen 22 and maintained on lower platen 24 so that the laminated structure continues to be held in place on lower platen 24. Controller 32 can then cause drive system 26 to return upper platen 22 to the position of FIG. 1A (step 229). The operator can then position another sheet on upper platen 22 to be added to the top of the laminated structure by repeating the steps above.

Figure 3:
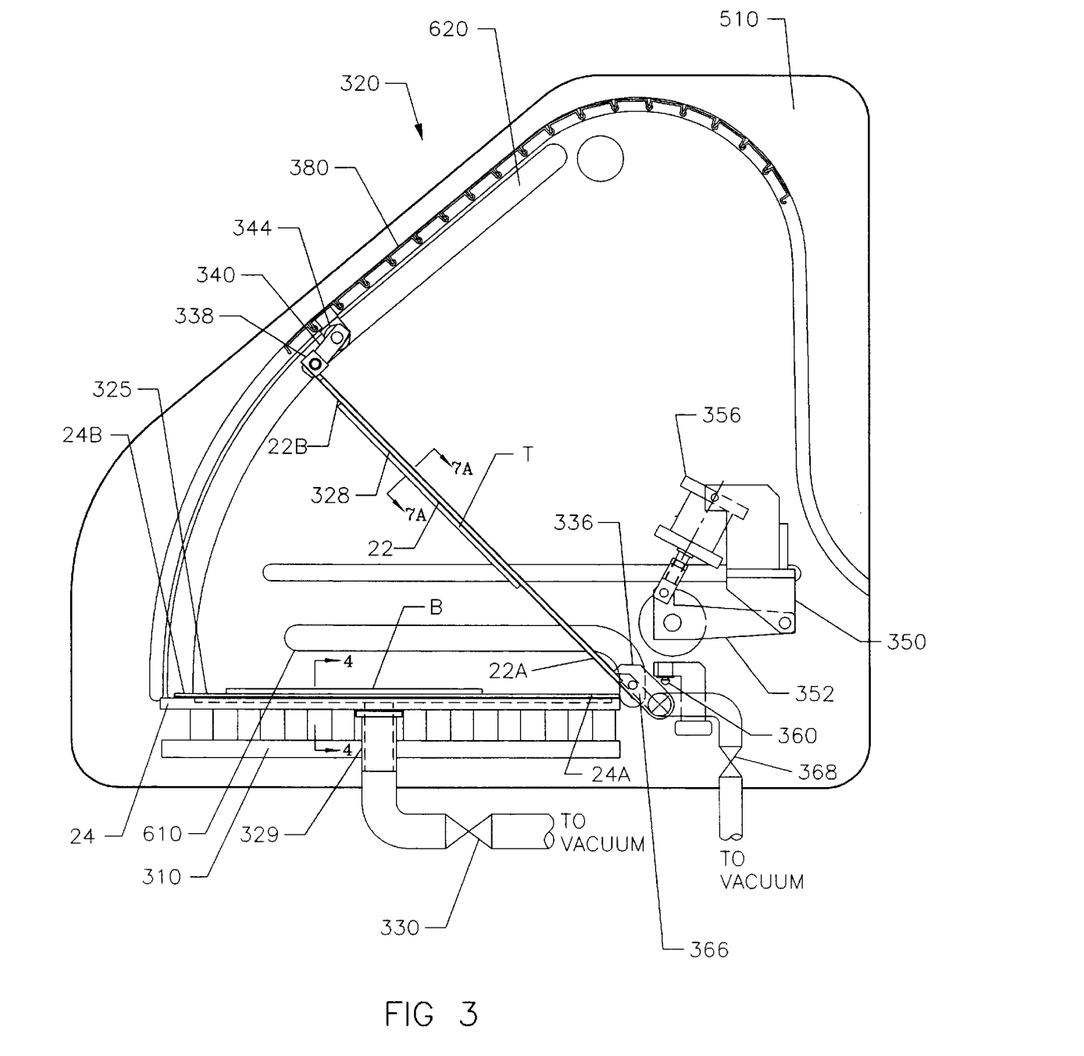
FIG. 3 is a longitudinal section through apparatus according to a preferred embodiment of the invention with some parts removed for clarity.
Figure 4:
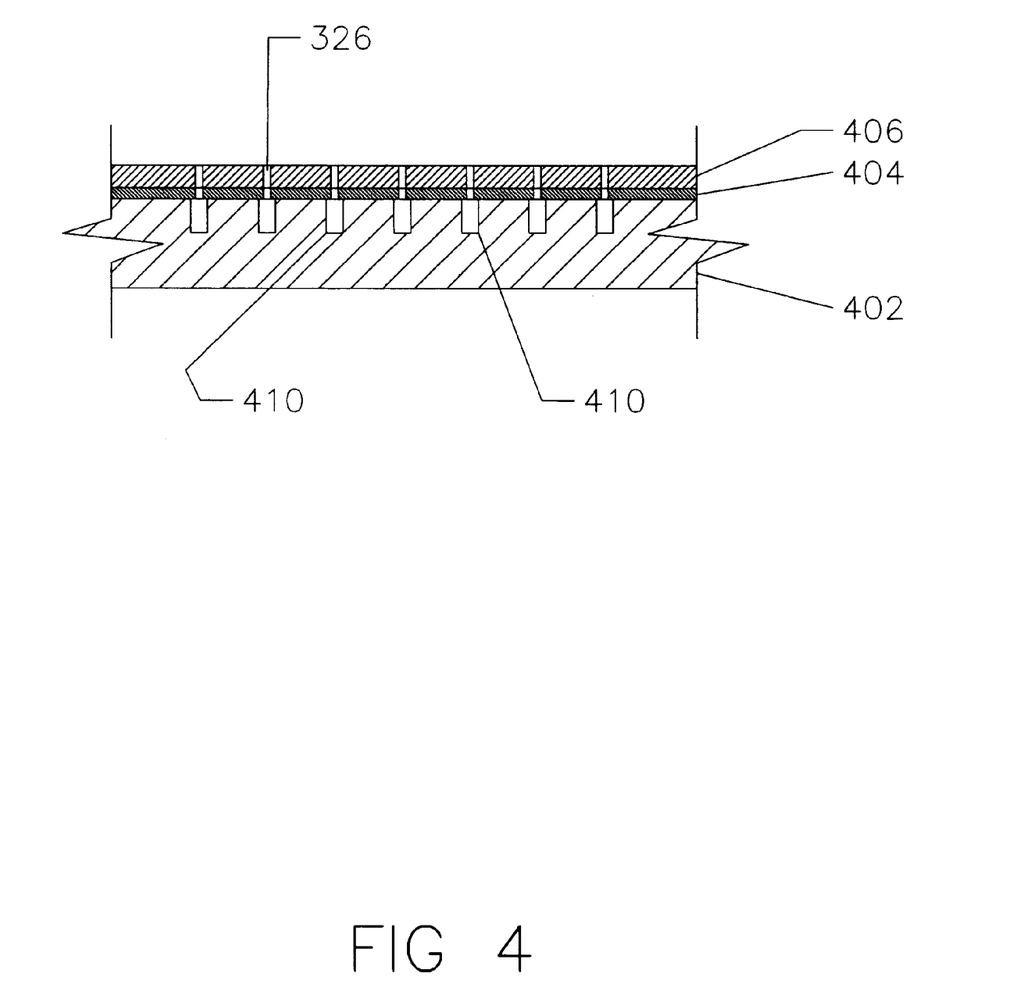
FIG. 4 is a section through the lower platen of the apparatus of FIG. 3 on the line 4—4.

Now that the general mode of operation of apparatus 20 has been explained, the various components of a preferred embodiment of apparatus 20 will be described in more detail. FIG. 3, shows a preferred embodiment of apparatus 320 according to the invention. Apparatus 320 comprises a rigid frame 302 to which lower platen 24 is mounted. Lower platen 24 is preferably a vacuum platen. The upper surface 325 of lower platen 24 is perforated by a large number of small holes 326 (FIG. 4). Holes 326 are all in fluid communication with a plenum 329 which is connected to a valve 330. Valve 330 may be opened to connect plenum 329 to the suction side of a vacuum pump (not shown) or other suitable source of vacuum. When valve 330 is open then air underneath bottom sheet B on lower platen 24 is evacuated and atmospheric pressure holds bottom sheet B in place on lower platen 24. Preferably holes 326 in portions of lower platen 24 outside of the area covered by bottom sheet B are masked off to avoid loss of vacuum. Valve 330 may be closed to release bottom sheet B. Preferably valve 330 is controlled by controller 32.

Lower platen 24 may be constructed in many ways. Vacuum platens are known in the art. Those skilled in the art will understand that various designs of platen may be used for lower platen 24. In the currently preferred embodiment of the invention, lower platen 24 comprises a thick metal base plate 402 (FIG. 4) rigidly affixed to frame 302, a perforated metal plate 404 lying atop base plate 402 and a thin perforated layer 406 of a resilient material, such as ⅛ inch thick hard neoprene or urethane overlying the perforated metal plate. The resilient material helps to provide even pressure across the sheets being laminated together. Base plate 402 comprises a plurality of channels 410 which connect to plenum 329.

Holes 326 most preferably cover no more than about 5% of the surface area of lower platen 24. If holes 326 are too large or too closely spaced then the surface of bottom sheet B in contact with upper surface 325 may be forced into holes 326 and distorted during lamination.

Figure 5:
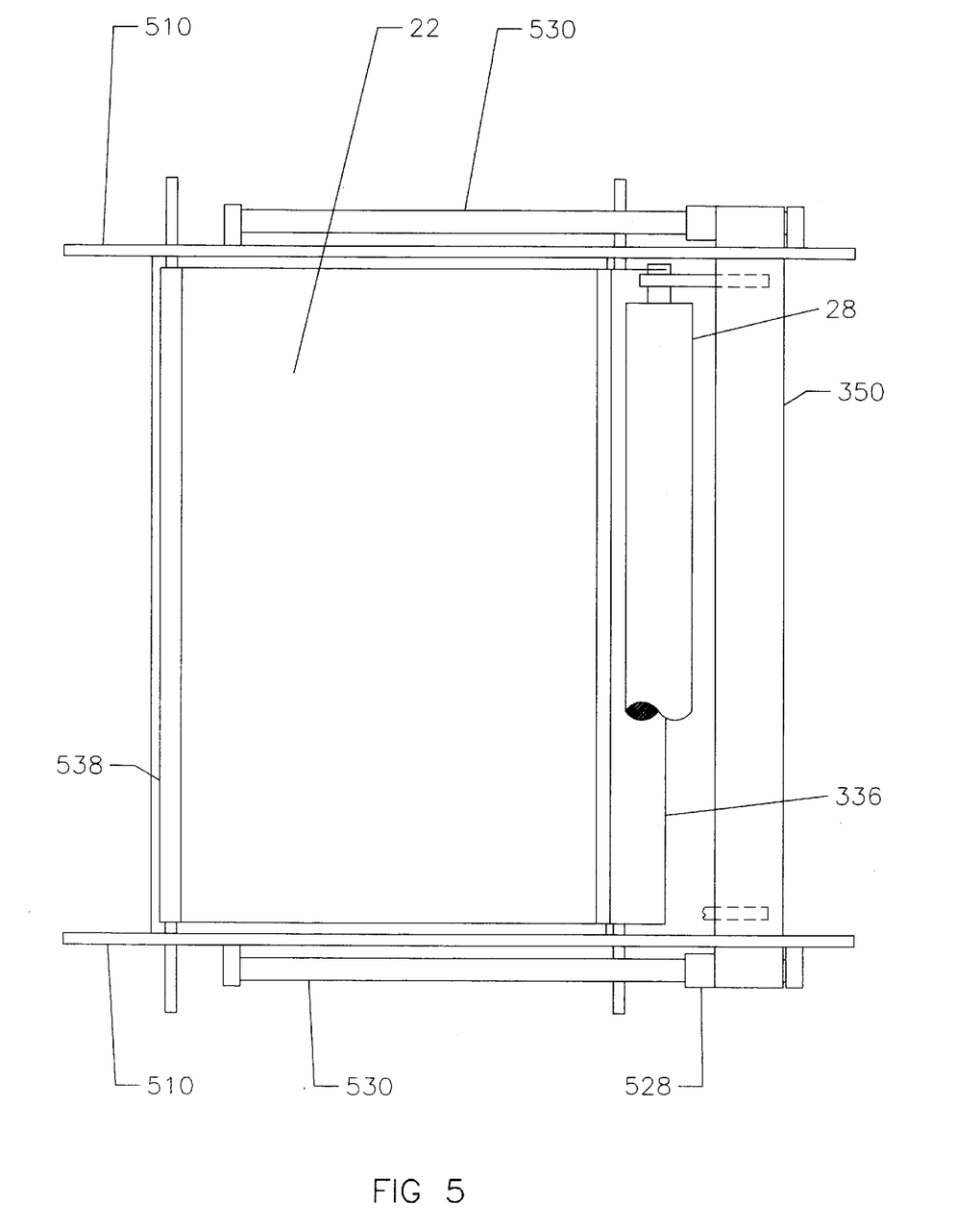
FIG. 5 is a simplified top plan view of the apparatus of FIG. 3.
Figure 6:
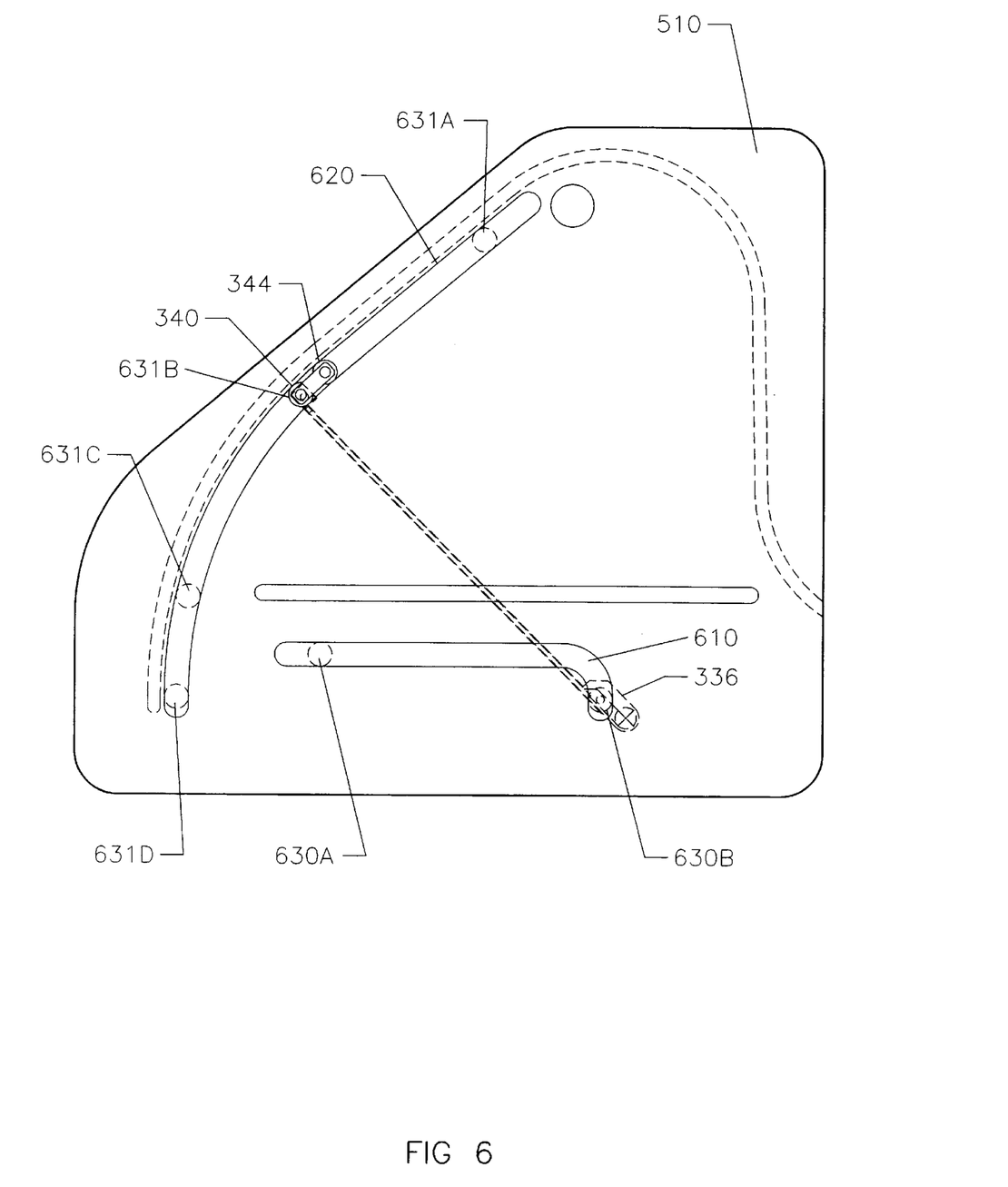
FIG. 6 is a simplified side elevational view of an end plate for the apparatus of FIG. 3.

Upper platen 22 is mounted between a pair of transverse rigid support members. Rear edge 22A of upper platen 22 is connected to a first support member 336. The ends of support member 336 are slidably received in tracks 610 (FIG. 6) in support plates 510 (FIG. 5) on either side of apparatus 320. The support plates 510 on either side of apparatus 320 are essentially mirror images of one another. Front edge 22B of upper platen 22 is attached to a second transverse support member 338. The ends of second support member 338 are connected by links 340 to roller carriages 344 which are slidably engaged in tracks 620 in support plates 510.

Actuators controlled by controller 32 can move member 336 to selected positions along tracks 610 and can move roller carriages 344 to selected positions along tracks 620. The actuators may be used to move upper platen 22 between the various positions illustrated in FIGS. 1A through 1D. To move upper platen 22 into the position of FIG. 1A, member 336 is moved along track 610 to the position labelled 630A and roller carriages 344 are moved along tracks 620 to the position labelled 631A. Upper platen 22 may be moved to the position of FIG. 1B by moving member 336 along tracks 610 to position 630B. As this happens, roller carriages 344 slide down tracks 620 to position 631B. Upper platen may be moved into the position shown in FIG. 1C by moving roller carriages 344 to position 631C while leaving member 336 in position 630B.

Figure 8:
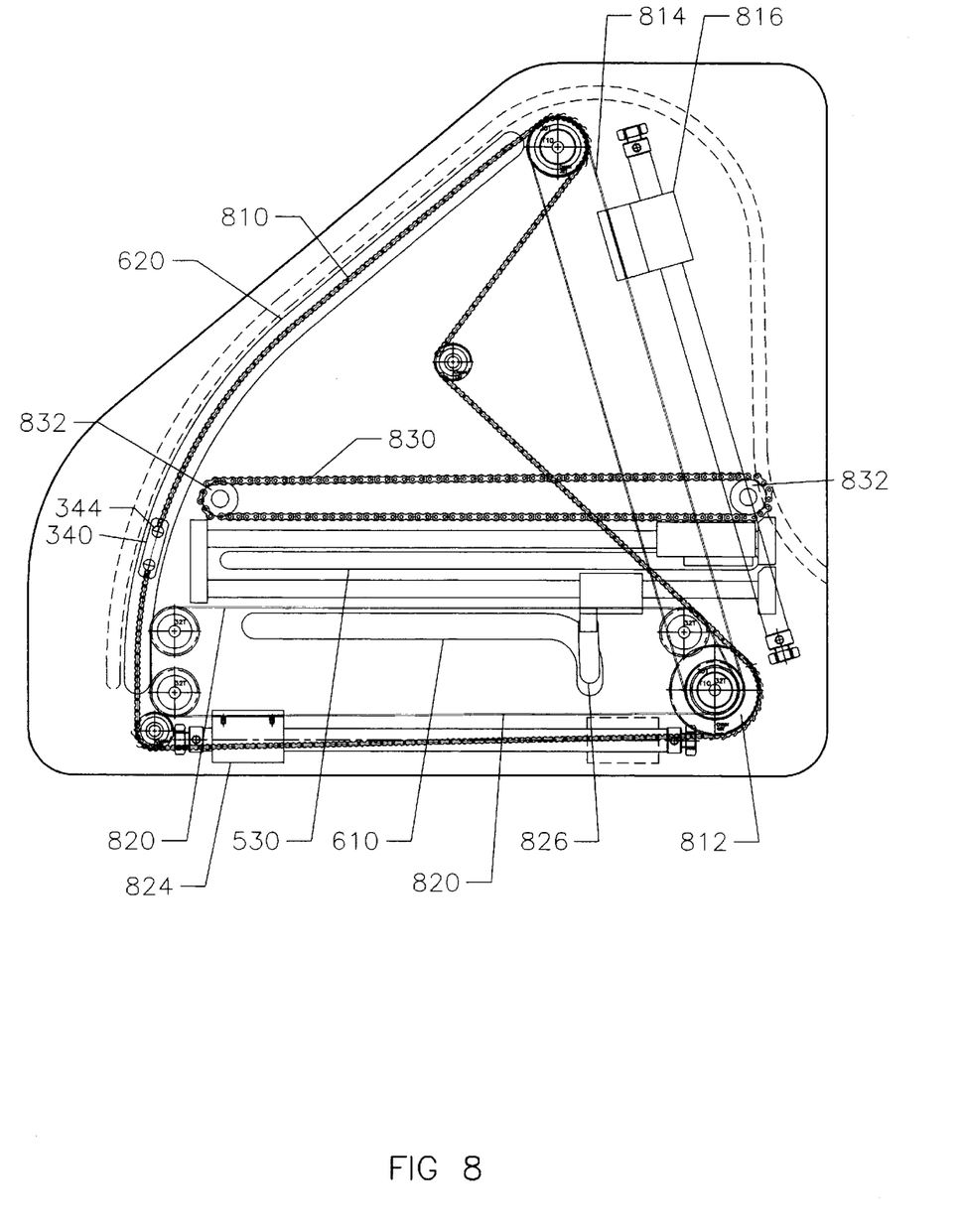

Those skilled in the art will understand that many different types and configurations of actuators may be used to position roller carriages 344 and the ends of member 336 along their respective tracks. In the currently preferred embodiment of the invention, roller carriages 344 are each coupled to a chain 810 (FIG. 8) which extends along a path having a portion which follows tracks 620. The chain is driven by a sprocket 812 which is coupled to a timing belt 814 driven by a linear actuator 816, such as a rodless pneumatic cylinder. Moving linear actuator 816 through its range of motion causes roller carriages 344 to travel along tracks 620. A similar drive mechanism is provided to move each end of member 336 along tracks 610. The drive mechanism for member 336 comprises, for example, a timing belt 820 driven by a linear actuator 824. Timing belt 820 is connected to member 336 by links 826.

The actuator which drives roller carriages 344 provides the force necessary to flex upper platen 22 during the laminating portion of the cycle of operation of apparatus 320. Because it is the upward force on roller carriages 344 rather than their precise positions that is important during this part of the cycle, it is convenient to drive roller carriages 344 with a pneumatic actuator, as noted above. A pneumatic actuator can be readily controlled to provide a substantially constant force through out a range of motion.

Upper platen 22 is transversely flexible but is laterally rigid. Members 336 and 338 therefore remain parallel. It is desirable to position upper platen 22 so that its position relative to lower platen 24 is very accurately fixed when top sheet T and bottom sheet B are in contact with one another. Apparatus 320 comprises a pair of locating members 360 mounted to frame 302. The support members comprise balls which are spaced to be received in corresponding spherical sockets at spaced apart points along support member 336 as upper platen 22 is moved to into the position of FIG. 1C. The construction of upper platen 22 is described in more detail below.

Press roller 28 is mounted to a transverse carriage 350. Carriage 350 slides on linear bearings 528 along guide rods 530 which extend along either side of apparatus 320. A drive mechanism is provided to move carriage 350 back and forward along guide rods 530. The drive mechanism should be capable of moving carriage 350 at a substantially constant speed while a structure is being laminated. The drive mechanism may include, by way of example only, first and second loops of chain 830 which extend around sprockets 832 at either end respectively of each guide rod 530. The loops of chain 830 may be connected to a reversible electric motor to allow carriage 350 to be pulled in either direction across lower platen 24.

Press roller 28 is mounted for rotation at one end of an arm 352 which is pivotally attached to carriage 350. A press roller actuator, such as a pneumatic cylinder 356, is provided on carriage 350 to press downwardly on arm 352 and to therefore provide a selected downward force on press roller 28. A downward force of about 300 pounds to 400 pounds is typically required to laminate a structure 24 inches wide. Press roller 28 may be a smooth rigid roller. For example, where upper platen is about 25 inches wide, it has been found that an aluminum roller roughly 3 inches in diameter and 30 inches long provides a suitable press roller 28.

The design of upper platen 22 is important to the proper functioning of apparatus 320. If upper platen 22 is too thick or too compressible then the nip between press roller 28 and lower platen 24 will be wide. That is, the force exerted by press roller 28 on the rear face of upper platen 22 will be spread over an undesirably broad area of the laminated structure during lamination. As a result, the pressures on the laminated structure will be undesirably low. This can result in the entrapment of air bubbles in the laminated structure. It is desirable to maintain a narrow nip in which the forces exerted by press roller 28 are spread over a narrow line on the structure being laminated. It is also desirable that the lower surface 328 of upper platen 22 which holds top sheet T should not stretch significantly as upper platen 22 bends. That is, the bending axis of upper platen 22 should be as close as possible to surface 328.

Figure 7A:
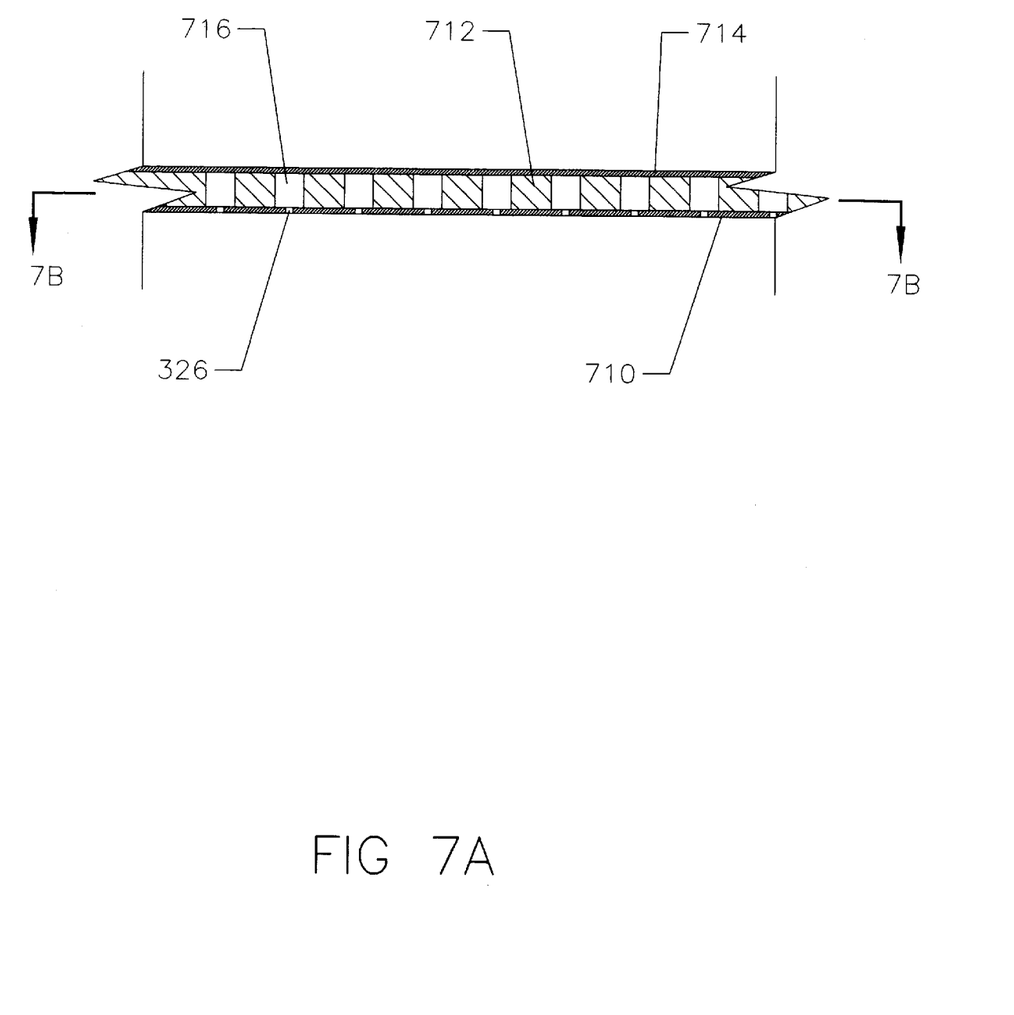
FIG. 7A is a fragmentary transverse sectional view through the upper platen of the apparatus of FIG. 3 on the line 7A—7A; and, FIG. 7B is a fragmentary section in the plane of the upper platen of FIG. 7A on the line 7B—7B; and, FIG. 8 is an elevational view showing the arrangement of drive systems for operating moving parts of the apparatus of FIG. 3 in which other parts have been removed for clarity.

As shown in FIG. 7A, upper platen 22 preferably comprises a laterally rigid perforated sheet 710 of a resiliently flexible material such as a 1/32 inch thick sheet of stainless steel perforated with holes 326. A flexible pad containing vacuum passages is bonded to the back of sheet 710. The material of the pad is preferably an elastomeric material such as neoprene or urethane. The material of the flexible pad preferably has a hardness in the range of about durometer 50 to about durometer 80 on the Shore D scale. And most preferably has a hardness of about durometer 60.

Figure 7B:
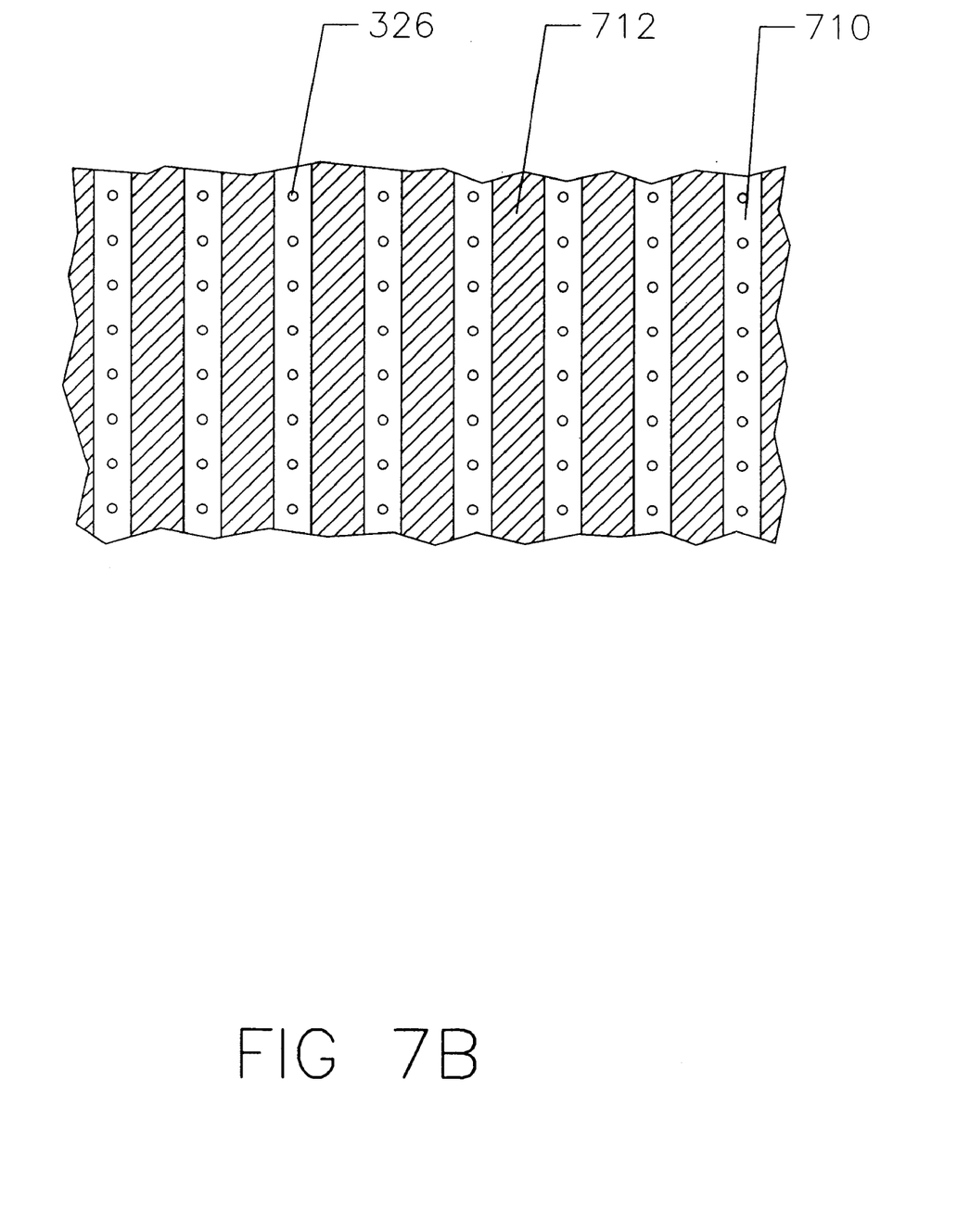

The flexible pad in the embodiment of FIG. 7 comprises a thin slotted layer 712 of a firm flexible material bonded to the rear surface of sheet 710. A backing layer 714 of firm flexible material is bonded to slotted layer 712. Slotted layer 712 comprises a plurality of parallel slots 716. Slots 716 extend generally perpendicularly to the orientation of press roller 28. As described above in respect of lower platen 24 holes 326 should most preferably cover no more than about 5% of the surface area of upper platen 22.

Slots 716 connect to a plenum 366 in support member 336. Plenum 366 is connected to a valve 368 by a flexible vacuum conduit (not shown). Valve 368 may be opened to connect plenum 366 to the suction side of the vacuum pump (not shown) or other suitable source of vacuum. When valve 368 is open then air between top sheet T on upper platen 22 is evacuated and atmospheric pressure holds top sheet T in place on upper platen 22. Preferably holes 326 in portions of upper platen 22 outside of the area covered by top sheet T are masked off to avoid loss of vacuum. Valve 368 may be closed to release top sheet T. Preferably valve 368 is controlled by controller 32.

Slots 716 must be large enough to provide the necessary vacuum at holes 326 and yet must have dimensions small enough that they do not cause the pressure to vary in the nip between press roller 28 and lower platen 24. Each slot 716 is preferably separated from adjacent slots 716 by a piece of material wider than slots 716.

Controller 32 may be any suitable control system. For example, controller 32 may comprise a programmable controller connected to suitable sensors indicating the current state of apparatus 320 and connected to actuators to operate apparatus 320. As those skilled in the art are familiar with the application of controllers to automate the operation of electromechanical equipment, it is not necessary to describe such controllers here.

Because apparatus 320 comprises several parts which are driven with sufficient force to hurt a person, apparatus 320 includes a guard 380. Guard 380 covers the moving parts of apparatus 320 during lamination. In the apparatus of FIG. 3, guard 380 is a roll top which slides along tracks in end plates 510.

As will be apparent to those skilled in the art in the light of the foregoing disclosure, many alterations and modifications are possible in the practice of this invention without departing from the spirit or scope thereof. For example, while this apparatus has been described as having an upper platen and a lower platen it is clear that the orientations of the platens is not significant to the general operation of this invention. Only the relative positions of the two platens is important. Apparatus 320 could be operated upside down or sideways. In the appended claims a platen which fulfills the role of the lower platen described above is called a "first" platen and a platen which fulfills the role of the upper platen described above is called a "second" platen. Furthermore, while apparatus 320 has one movable platen and one fixed platen, it would be possible to make a machine according to the invention having two platens which are both constructed like the upper platen described above wherein the two platens are compressed between a pair of press rollers.

Any suitable types of actuators may be used to move the moving parts of apparatus according to the invention. The invention is not limited to the use of the electrical and/or pneumatic actuators described above.

While the platens are described as being vacuum platens, the invention could be practised in some circumstances by using platens which hold sheets in some other manner. For example, in some cases, electrostatic platens might be used in apparatus which otherwise functions substantially as described above. The design and provision of a transversely flexible upper platen is, however, considered to be an inventive feature of the invention.

Those skilled in the art will understand that other alterations and modifications are possible in the practice of this invention without departing from the spirit or scope thereof. Accordingly, the scope of the invention is to be construed in accordance with the substance defined by the following claims.

I claim:

1. Laminating apparatus for laminating first and second sheets together into a laminated structure, the laminating apparatus comprising:

(a) a first platen for holding a first sheet to be laminated into a laminated structure;

(b) a press roller oriented transversely to and parallel with a surface of the first platen, the press roller slidably coupled to the first platen for motion across the surface of the first platen;

(c) a transversely flexible second vacuum platen for holding a second sheet to be laminated into the laminated structure, the second platen positionable between the press roller and the first platen, the second platen having first and second faces, the first face facing the surface of the first platen and the second face facing the press roller when the second platen is between the press roller and the first platen;

(d) a drive system for driving the press roller across the second face of the second platen toward an edge of the second platen and forcing the press roller toward the surface of the first platen; and, (e) an actuator coupled to the second platen to pull the edge of the second platen away from the surface of the first platen, thereby resiliently bending the second platen about the press roller.

2. The apparatus of claim 1 wherein the second platen comprises a perforated transversely resiliently flexible sheet backed by a flexible pad, the flexible pad containing vacuum passages connecting perforations in the flexible pad to a vacuum plenum.

3. The apparatus of claim 2 wherein the flexible pad comprises a pad of an elastomeric material and the vacuum passages comprise grooves extending in the flexible pad in a direction generally perpendicular to the press roller.

4. The apparatus of claim 3 wherein the flexible pad comprises a slotted layer of elastomeric material bonded to a backing layer of elastomeric material.

5. The apparatus of claim 4 wherein the resiliently flexible sheet comprises a sheet of stainless steel perforated by apertures wherein the apertures cover no more than about 10% of a surface area of the resiliently flexible sheet.

6. The apparatus of claim 5 wherein the elastomeric material of the flexible pad has a hardness in the range of about durometer 50 to about durometer 80 on the Shore D scale.

7. A method for laminating first and second sheets together to form a laminated structure, the method comprising:

a) holding the first sheet on a surface of a first platen;

b) holding the second sheet on a face of a second platen;

c) positioning the second platen adjacent to the first platen with the first sheet aligned with the second sheet;

d) flexing the second platen by pressing a press roller against a back face of the second platen while holding an edge portion of the second platen away from the surface of the first platen; and, e) moving the press roller across the back face of the second platen, thereby bringing and compressing the first and second sheets together in alignment with one another along a nip between the press roller and the surface of the first platen.

8. A method for laminating first and second sheets together to form a laminated structure, the method comprising:

a) holding the first sheet on a surface of a first platen;

b) holding the second sheet on a front face of a second platen;

c) resiliently bending the second platen by pressing a press roller against a back face of the second platen while holding an edge portion of the second platen away from the surface of the first platen; and, d) moving the press roller across the back face of the second platen, thereby bringing and compressing the first and second sheets together in alignment with one another along a nip between the press roller and the surface of the first platen.

9. The method of claim 8 wherein holding the second sheet comprises creating a reduced pressure between the second sheet and the second platen.

10. The method of claim 9 wherein the second platen comprises a perforated transversely resiliently flexible sheet backed by a flexible pad, the flexible pad containing vacuum passages connecting perforations in the flexible pad to a vacuum plenum and holding the second sheet comprises creating a reduced pressure within the vacuum plenum.

11. Laminating apparatus for laminating first and second sheets together into a laminated structure, the laminating apparatus comprising:

(a) first platen means for supporting a first sheet to be laminated into a laminated structure;

(b) second platen means for supporting a second sheet to be laminated into the laminated structure in aligned relationship with the first sheet;

(c) pressing means for a pressing the first and second platen means together along a nip;

(d) actuator means for moving the nip across the first and second platen means to laminate together the first and second sheets in a first region across which the nip has passed; and, (e) actuator means for bending the second platen means about the pressing means and away from the first platen means to hold the first and second sheets apart in a second region over which the nip has not yet passed while maintaining the first and second sheets in the first region in contact with the first and second platen means respectively.

12. The apparatus of claim 11 wherein the pressing means comprises a press roller and the apparatus comprises means for pressing the press roller against a rear face on the second platen means.

13. The apparatus of claim 11 wherein the second platen means comprises a perforated transversely resiliently flexible sheet backed by a flexible pad, the flexible pad containing vacuum passages connecting perforations in the flexible pad to a vacuum plenum.

14. The apparatus of claim 13 wherein the flexible pad comprises a pad of an elastomeric material and the vacuum passages comprise grooves extending in the flexible pad in a direction generally perpendicular to the press roller.

15. The apparatus of claim 14 wherein the flexible pad comprises a slotted layer of elastomeric material bonded to a backing layer of elastomeric material.

16. The apparatus of claim 15 wherein the resiliently flexible sheet comprises a sheet of stainless steel perforated by apertures wherein the apertures cover no more than about 10% of a surface area of the resiliently flexible sheet.

\* \* \* \* \*